United States Patent
Kostelnik et al.

(10) Patent No.: US 6,558,464 B2
(45) Date of Patent: *May 6, 2003

(54) VERY HIGH SOLIDS TIO₂ SLURRIES

(75) Inventors: Robert J. Kostelnik, Ellicott City, MD (US); Fu-chu Wen, Severna Park, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/779,297

(22) Filed: Feb. 7, 2001

(65) Prior Publication Data

US 2001/0007231 A1 Jul. 12, 2001

Related U.S. Application Data

(63) Continuation of application No. 09/072,737, filed on May 4, 1998, now Pat. No. 6,197,104.

(51) Int. Cl.⁷ ............... C04B 14/30; C09C 1/36
(52) U.S. Cl. .............. 106/447; 106/448; 106/449
(58) Field of Search ............... 106/447, 448, 106/449, 436, 499

(56) References Cited

U.S. PATENT DOCUMENTS

| | | | |
|---|---|---|---|
| 2,744,029 A | 5/1956 | Kingsbury | 106/300 |
| 3,536,510 A * | 10/1970 | Allen et al. | 106/447 |
| 3,647,495 A * | 3/1972 | Cline | 106/447 |
| 3,754,956 A | 8/1973 | Durrant et al. | 106/300 |
| 3,767,455 A | 10/1973 | Claridge et al. | 117/65.2 |
| 3,873,335 A | 3/1975 | Schmidt et al. | 106/300 |
| 3,948,448 A | 4/1976 | Wehren et al. | 241/18 |
| 4,146,516 A | 3/1979 | Braun et al. | |
| 4,177,081 A | 12/1979 | DeColibus | |
| 4,280,849 A | 7/1981 | Howard et al. | 106/300 |
| 4,288,254 A | 9/1981 | Gladu | 106/300 |
| 4,421,889 A | 12/1983 | Braun et al. | |
| 4,427,450 A | 1/1984 | Kostansek | 106/288 |
| 4,427,451 A | 1/1984 | Baloga | 106/300 |
| 4,474,681 A | 10/1984 | Belde et al. | 252/314 |
| 4,601,759 A | 7/1986 | Furubayashi et al. | 106/308 |
| 4,605,309 A | 8/1986 | Albers | 366/76 |
| 4,759,800 A | 7/1988 | Luginsland et al. | 106/437 |
| 4,868,228 A | 9/1989 | Gonnet et al. | |
| 4,978,396 A | 12/1990 | Story | 106/436 |
| 5,154,362 A | 10/1992 | Knobloch et al. | 241/24 |
| 5,236,989 A | 8/1993 | Brown et al. | |
| 5,244,121 A | 9/1993 | Shomer | 222/102 |
| 5,266,108 A | 11/1993 | Hauck | 106/437 |
| 5,279,463 A | 1/1994 | Holl | 241/1 |
| 5,279,662 A | 1/1994 | Smith | |
| 5,290,352 A | 3/1994 | Kröckert et al. | 106/436 |
| 5,332,433 A | 7/1994 | Story et al. | 106/442 |
| 5,385,753 A | 1/1995 | Hu et al. | 427/215 |
| 5,432,239 A | 7/1995 | Egraz et al. | |
| 5,468,471 A | 11/1995 | Zecchino et al. | 424/59 |
| 5,484,620 A | 1/1996 | Oechsle et al. | 426/422 |
| 5,496,403 A | 3/1996 | Gaedcke et al. | 106/400 |
| 5,500,331 A | 3/1996 | Czekai et al. | 430/449 |
| 5,503,337 A | 4/1996 | Kreuziger | 241/21 |
| 5,520,340 A | 5/1996 | Kröckert et al. | 241/5 |
| 5,538,191 A | 7/1996 | Holl | 241/1 |
| 5,554,215 A | 9/1996 | Simpson et al. | 106/436 |
| 5,653,793 A * | 8/1997 | Ott et al. | 106/437 |
| 5,746,819 A | 5/1998 | Kostelnik et al. | |
| 5,824,145 A * | 10/1998 | Marganski et al. | 106/436 |
| 6,197,104 B1 * | 3/2001 | Kostelnik et al. | 106/447 |

FOREIGN PATENT DOCUMENTS

| | | | |
|---|---|---|---|
| AU | 1441888 | 4/1988 | B02C/23/12 |
| GB | 1204326 | 12/1966 | C01G/23/04 |
| GB | 2273670 | 11/1993 | B02C/19/06 |
| JP | 9193-964 A | 4/1983 | |

OTHER PUBLICATIONS

Muschelknautz, Dr.–Ing E., et al., "Strömungsvorgänge bei der Zerkleinerung in Strahlmülen", Chem. Ing. Techn., 12 Jahrg. 1970, No. 1 (no month).

Pietsch, Wolfgang, "Pressure Agglomeration—State Of The Art", Proceedings of the 2nd International Symposium on Agglomeration, AIMMPE, New York, 1997 (no month).

* cited by examiner

Primary Examiner—Michael Marcheschi
(74) Attorney, Agent, or Firm—Kalow & Springnut LLP; David A. Kalow; William D. Schmidt

(57) ABSTRACT

The present invention discloses high solids slurries of anatase titanium dioxide pigment comprising greater than about 75% by weight of anatase $TiO_2$ pigment dispersed in water. A process for producing the slurries of the present invention is disclosed which comprises the steps of a) dry milling the anatase titanium dioxide pigment, preferably by pressure rolling, and b) mixing the dry milled pigment with water in the presence of an acrylic acid dispersant.

42 Claims, No Drawings

VERY HIGH SOLIDS TIO$_2$ SLURRIES

CROSS-REFERENCE TO RELATED APPLICATIONS

This application is a continuation of U.S. application Ser. No. 09/072,737, filed May 4, 1998, U.S. Pat. No. 6,197,104 which is herein incorporated by reference.

FIELD OF THE INVENTION

The present invention relates to very high solids slurries of TiO$_2$, and processes for preparing same.

BACKGROUND OF THE INVENTION

Titanium dioxide is produced commercially in two crystalline polymorphic forms, namely the rutile form which can be produced by both the chloride and sulfate processes and the anatase form which is produced by the sulfate process. The anatase and rutile forms of TiO$_2$ differ not only in their crystallographic structures but also in the type and amount of surface and other impurities resulting from their differing methods of production. These differences are such that generally the rutile form produced by the chloride process and the anatase form produced by the sulphate process are processed and refined into finished pigments by significantly different methodologies, with one procedure often not being effective with both forms of TiO$_2$. This invention is applicable to both the rutile and anatase forms of TiO$_2$ produced by the sulphate process, but provides especially notable improvements when practiced with anatase TiO$_2$.

Sulfate anatase TiO$_2$ is generally produced by digesting a titaniferous ore, such as ilmenite ore, ore concentrates and blends thereof, in concentrated sulfuric acid to form an iron sulfate-titanium sulfate solution which is subsequently cooled to precipitate out the iron sulfate as copperas. The clarified and concentrated titanium sulfate solution is then heated to hydrolyze and precipitate out hydrous TiO$_2$. The hydrous titanium dioxide is calcined at an elevated temperature sufficiently high, i.e. at least about 450 to about 1000° C., to partially or completely dehydrate the titanium dioxide to form a water insoluble anatase, or rutile TiO$_2$ pigment, as the case may be. The crude product resulting from the calcination contains a substantial amount of large particles and grit which must be broken up by either dry or wet grinding.

After dry or wet grinding of TiO$_2$ pigment to a desired pigmentary particle size, the pigment may be shipped to end users as either a dry powder or an aqueous slurry. The shipment of high solids aqueous slurries has certain advantages to end-users because they do not have to undertake the rather complex and time consuming process of mixing titanium dioxide pigments and water for use in making paper, coatings, paint or other products. However, it also presents disadvantages in that the shipping of large amounts of water over large distances is an inefficient use of resources. Another disadvantage is that the water present in lower solids slurries may create excess dilution in certain applications, such as high solids paper coating, requiring costly and time consuming drying or slowing of paper coating equipment to remove the excess water.

It is known that crude TiO$_2$ may be compacted and crushed or ground after its production to break-up oversized particles, grit, lumps and aggregates. High solids slurries of anatase TiO$_2$ containing greater than 73% anatase TiO$_2$ solids, however, have heretofore not been commercially available.

For instance, U.K. Patent No. 1,204,326 describes subjecting calcined TiO$_2$ pigment discharge to a pressure rolling step and then a disintegration step which may be a wet milling step. Suspensions of 27 and 35.5% TiO$_2$ solids and paint containing 37% TiO$_2$ solids only are described in the examples.

U.S. Pat. No. 5,290,352 discloses the same process as U.K. Patent No. 1,204,326 for preparing inorganic pigment suspensions, including TiO$_2$ pigment suspensions. Suspensions having solids contents of from 5 to 75% by weight are claimed. However, suspensions of 20 to 25% TiO$_2$ solids only are described in the examples.

U.S. Pat. No. 5,154,362 discloses a method for crushing brittle material involving first crushing the material in a roller mill to form agglomerates which are then broken up, screened, and passed to a dry or wet mill for further grinding. In U.S. Pat. No. 5,520,340, compacting inorganic pigment on a drum compactor, then de-agglomerating the compacted pigment before it is jet milled is disclosed. In neither patent is the formation of pigment suspensions disclosed.

Resort to more involved processes to achieve high solids TiO$_2$ slurries have been attempted. U.S. Pat. No. 4,280,849 discloses a process for preparing high solids titanium dioxide slurries in which a first pressure filter cake of a coated TiO$_2$ is mixed with a dispersing agent, preferably in a sand mill, then dewatered under superatmospheric conditions to produce a second filter cake that is reslurried to form a high solids slurry of 60 to 75% coated titanium dioxide. Similarly, U.S. Pat. No. 4,978,396 discloses a method said to be useful in obtaining 70 to 80% solids slurries of rutile or anatase titanium dioxide in which an initial low solids slurry of wet milled and hydroclassified pigment is dewatered under superatmospheric conditions to produce a wet filter cake that is reslurried to form the high solids slurry. The lone example of this patent obtained a solids content of 71%.

U.S. Pat. No. 4,288,254 discloses a process for preparing a high solids slurry of rutile TiO$_2$ by passing a slurry of wet milled or, dry micronized, dispersant-coated TiO$_2$ through a high sheer mill to de-agglomerate the TiO$_2$. The sole example shows the preparation of a slurry having at most 64.6% solids.

SUMMARY OF THE INVENTION

The present invention relates to high solids anatase TiO$_2$ slurries comprising greater than about 75% by weight of anatase TiO$_2$ pigment and water. The high solids slurries are free-flowing and pumpable.

The high solids result from dry milling anatase TiO$_2$ prior to mixing with water to form the slurry.

Accordingly, the present invention also provides a process for producing a high solids anatase TiO$_2$ slurry. The process comprises the steps of a) dry milling anatase TiO$_2$ pigment and b) mixing the dry milled anatase TiO$_2$ pigment with water thereby forming a slurry comprising greater than about 75% anatase TiO$_2$ pigment. Though grinding mills, such as Raymond mills, and other dry mills are usefully employed in the present invention, particularly advantageous is the use of crushing mills, especially pressure rollers.

The slurries of the present invention are fluid and stable at a wide range of pH levels, which was heretofore unachievable with high solids anatase TiO$_2$ slurries. Anatase TiO$_2$ slurries comprising greater than about 74% solids and having a pH of less than about 9 are a particularly desirable achievement.

Therefore, the present invention provides a high solids slurry of anatase $TiO_2$ pigment comprising greater than about 74% by weight of anatase $TiO_2$ pigment and water; and having a pH of less than about 9.

Also, forming the high solids slurry in the presence of a preferred acrylic acid dispersant enhances the viscosity stability and reduces the tendency of the slurry to flocculate.

Thus, the present invention provides a high solids slurry of anatase $TiO_2$ pigment additionally comprising a dispersant selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymers or copolymers have been partially or completely neutralized with a neutralizing agent having a monovalent group and at least one neutralizing agent having a polyvalent group.

The present invention also provides a process of preparing a high solids slurry of anatase titanium dioxide pigment which comprises greater than about 75% anatase $TiO_2$ pigment, comprising a) dry milling anatase $TiO_2$ pigment; and mixing said dry milled $TiO_2$ pigment with water in the presence of a dispersant selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymers or copolymers have been partially or completely neutralized with a neutralizing agent having a monovalent group and at least one neutralizing agent having a polyvalent group, thereby forming said slurry.

Further, the process of the present invention is also effective in making high solids slurries of rutile $TiO_2$ produced by the sulfate process, as well as high solid slurries of anatase $TiO_2$.

Thus, the present invention further provides a process for preparing a high solids slurry of $TiO_2$ produced by the sulphate process which slurry contains greater than about 75% $TiO_2$ pigment, comprising dry milling the $TiO_2$ pigment; and mixing the dry milled $TiO_2$ pigment with water in the presence of an acrylic acid dispersant thereby forming the high solids slurry.

DETAILED DESCRIPTION OF THE INVENTION

In accordance with the present invention high solids slurries of anatase $TiO_2$ are provided with a solids content in excess of any heretofore accomplished. Typically, commercial anatase $TiO_2$ slurries are produced and marketed at an anatase $TiO_2$ solids content of no greater than 73% on a weight basis. This has been thought to be the maximum amount of anatase $TiO_2$ that could be incorporated into a free-flowing slurry.

Slurries having an anatase $TiO_2$ solids content of greater than about 75%, preferably greater than about 77%, and more preferably greater than about 80% by weight are readily provided by practice of the present invention. As most end uses of high solids anatase $TiO_2$ slurries should not require slurries having in excess of about 85% anatase $TiO_2$ solids, and as the time and energy expended in making slurries increases with the solids content, slurries containing up to about 85% anatase $TiO_2$ solids on a weight basis are preferred, and those containing up to about 81% anatase $TiO_2$ solids on a weight basis are more preferred. Of course, slurries of less than about 75% anatase $TiO_2$ solids, for example slurries having anatase $TiO_2$ solids contents of from about 60 to about 75%, also may be prepared in accordance with the present invention, if so desired.

The high solids slurries can be shipped to manufacturers for use in the making of products, such as paper, paints, and coatings, or for use in other pigmentary applications, or they may be first subjected to further processing such as wet milling, for example in a sandmill or a horizontal media mill, to provide a slurry with a more desirable mean pigmentary particle size or other attribute.

The high solids anatase $TiO_2$ slurries of the present invention have been observed to be, when subjected to further processing, more easily processed than prior slurries. It also has been observed that the present slurries are more readily pumped and dispersed and show little or no dilatency problems.

These latter properties can be attributed to the free-flowing viscosity and rheological properties of the high solids anatase $TiO_2$ slurries of the present invention. The slurries may have viscosities spanning a wide range depending on the use of which the slurry is to be made and the processing conditions and equipment to which it will be subjected (e.g. pumping, mixing, milling, filtering). High solids anatase $TiO_2$ slurries of the present invention may have any viscosity desired, however, as anatase $TiO_2$ slurries generally tend to become not readily pumpable at a Brookfield viscosity much greater than about 1500 cps., slurries having a Brookfield viscosity of less than about 1500 cps. are preferred, more preferred are slurries with a Brookfield viscosity of less than about 1000 cps. At very low viscosities, anatase $TiO_2$ tends to unduly settle out of the slurries. Thus, slurries having Brookfield viscosities of between about 400 to about 800 cps. are further preferred. (In the present application all Brookfield viscosities are given as measured using a Model LVT Brookfield viscometer with a number 3 spindle revolving at 60 rpm.)

In addition, high solid anatase $TiO_2$ slurries having a Hercules rheology such that their Hercules torque values are less than about $18 \times 10^5$ dynes-cm., at 4400 rpm., are preferred because such slurries are easily handled in mixers, plant process lines and pumps. More preferred are slurries having Hercules torque values from about 2 to about $12 \times 10^5$ dynes-cm. Slurries with higher Hercules torque values, especially slurries that are measured as being dilatent at less than about 1100 rpm., present handling difficulties in processing. (In the present application all Hercules torque values are given as determined using a Model ET-24-6 Hercules Hi-Shear Viscometer equipped with an "A" bob operating in accordance with TAPPI (Technical Association of the Pulp and Paper Industry) test method T648, except that the viscometer rpm was automatically increased from 0 to 4400 rpm during the measurement cycle. Torque values at 4400 rpm were read directly from the chart recorder. For slurries that were measured as being dilatent, the rpm at which the slurry was measured as being dilatent was recorded.)

The high solids contents, free-flowing viscosities and improved rheological properties of the present anatase $TiO_2$ slurries enable many end-use improvements and expand the limits within which many end users, such as paper manufacturers, were heretofore forced to operate.

The high solids anatase $TiO_2$ slurries of the present invention may include a dispersant to aid in their viscosity stability and resistance to flocculation. Organic and inorganic dispersants useful in the slurries include alkanolamines and phosphates. Representative alkanolamines include isopropanol amine, diisopropanol amine, 2-amino-2-methyl-1,3-propanediol, 2-amino-2-methyl-1-propanol, aminoethanolamine, and triethanolamine. Representative phosphate dispersants include tetrapotassinm pyrophosphate, tetrasodium pyrophosphate, sodium tripolyphosphate, and potassium tripolyphosphate. The dispersants may be present in amounts up to about 5%. Preferably the dispersants are present in amounts of from about 0.05 to about 2%.

The abovementioned dispersants, while being effective in the subject invention, however, have been found to suffer from several shortcomings, most notably, poorer than desirable calcium tolerance, viscosity stability, foaming tendencies and tendency to flocculate in their usage applications when compared to acrylic acid dispersants. Accordingly, in practice of the present invention, it is preferred that the slurries of anatase $TiO_2$ are provided with improved slurry viscosity stability, calcium and magnesium tolerance, foaming tendency and tendency to flocculate by containing a sufficient quantity of an acrylic acid dispersing agent selected from the group consisting of acrylic acid homopolymers and copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the above acids, which have been partially or completely neutralized with a neutralizing agent having a monovalent group and at least one neutralizing agent having a polyvalent group. Such preferred dispersants are more fully described in U.S. patent application Ser. No. 08/557,953, issued as U.S. Pat. No. 5,746,819, which disclosure in full is incorporated herein by reference.

The preferred acrylic acid dispersants useful in the practice of the present invention is produced by known processes of polymerization and has a molecular weight between 300 to 100,000, preferably between 1,000 to 20,000 and most preferably between 2,000 to 10,000.

The acid sites of the homopolymer or copolymer may be neutralized with combinations of neutralizing agents having monovalent or polyvalent groups. The neutralizing agent containing the monovalent group has a group selected from alkali metal cations, ammonium, aliphatic or cyclic primary, secondary or tertiary amines. The most preferred monovalent cations are sodium and potassium. The neutralizing agent containing the polyvalent group has a group selected from alkaline earth cations, zinc and aluminum. The most preferred polyvalent cation is calcium.

The degree of neutralization of the acid polymers by the neutralizing agents with monovalent cations is between 0.02 to 0.90, most preferably between 0.05 to 0.50. The degree of neutralization by the neutralization agents containing polyvalent cations is between 0.10 to 0.98, most preferably between 0.95 to 0.50.

The degree of neutralization can be achieved by neutralizing the acid polymer with a mixture of neutralizing agents containing monovalent and polyvalent cations or mixing the appropriate proportions of acid polymer neutralized with the monovalent cation containing neutralizing agents with the acid polymer neutralized with the polyvalent cation containing neutralizing agents.

The neutralized acid homopolymer or copolymer is contained in the slurry at an amount sufficient to achieve a fluid, stable viscosity slurry up to about 5% based on the weight of the anatase $TiO_2$ present in the slurry. The preferred content of the neutralized acid homopolymer or copolymer is 0.05 to 1.0%, and the most preferred range is 0.10 to 0.60% based on the weight of the anatase $TiO_2$ present in the slurry.

The high solids anatase $TiO_2$ slurries of the present invention also may have pH values spanning a wide range from about 5 to about 12. Though the desired pH for any slurry naturally will depend on the use of which the slurry is to be made, high solids anatase slurries at low pH values are especially advantageous.

Today, commercial high solids anatase slurries, which have a maximum solids content of about 72.5%, have pHs in excess of about 9. At pHs at or below about 9, these slurries are too viscous to be useful. In contrast to such slurries, the slurries of the present invention, even at solids levels greater than 74%, and at pHs less than about 9, are free-flowing and pumpable.

Production of high solids anatase $TiO_2$ slurries over a broad range of pH values enables a slurry to be tailored to the particular needs of its use, eliminating or greatly reducing the need for costly and time consuming neutralization or pH adjustment of the slurry or the products made from it.

Accordingly, particularly useful high solids anatase $TiO_2$ slurries are those having an anatase $TiO_2$ solids content of more than about 74%, preferably more than about 77%, and most preferably more than about 80%, and having a pH less than about 9. As the time and energy expended in making slurries increases with the solids content, and it is not expected that most end users will require anatase $TiO_2$ slurries having a solids content in excess of 85%, slurries containing up to about 85% anatase $TiO_2$ solids on a weight basis are preferred, and those containing up to about 81% anatase $TiO_2$ are more preferred. Of course, low pH slurries having anatase $TiO_2$ solids contents less than about 74%, for example from about 60 to about 74% solids, also may be prepared in accordance with the present invention, if so desired.

As many present day pigmentary applications for anatase $TiO_2$, such as paper coating and paper making, are carried out at pH levels of from about 7 to 9, high solids anatase $TiO_2$ slurries having a pH of from about 7 to about 9 are preferred. Further, as acidic or only slightly basic high solids slurries having more than about 74% anatase $TiO_2$ solids by weight have heretofore not been commercially available, such slurries having a pH of from about 5 to about 9 are preferred, and those having a pH of from about 5 to about 7 are even more preferred.

The low pH, high solids anatase $TiO_2$ slurries of the present invention may include a dispersant to aid in their viscosity stability and resistance to flocculation. Any of the organic or inorganic dispersants abovementioned are useful, with the acrylic acid dispersants being preferred. Of the preferred dispersants, the more preferred are as herein above described.

A particularly useful and preferred high solids anatase $TiO_2$ slurry in accordance with the present invention is a slurry containing at least about 74% by weight of anatase $TiO_2$ and having a Brookfield viscosity of less than about 1500 cps, a Hercules torque value of less than about $18 \times 10^5$ dynes-cm., and a pH of less than about 9.

The high solids anatase $TiO_2$ slurries of the present invention are prepared by first dry milling anatase $TiO_2$ pigment and then mixing the dry milled pigment with water to form a slurry.

The anatase $TiO_2$ pigment that is dry milled may be any dry pigment, whether it has or has not been previously dry ground, crushed, or milled. However, it is generally unnecessary to grind, crush, or mill anatase $TiO_2$ pigment prior to it being dry milled in accordance with the present invention to achieve high solids anatase $TiO_2$ slurries. Therefore, it is preferred that the anatase $TiO_2$ pigment be crude discharge product from the calciner, where it was produced, which has not been subjected to any prior intervening processing step that substantially grinds, crushes, or mills the discharge product. Further, the anatase $TiO_2$ pigment preferably is not slurried or wet milled prior to being dry milled.

The anatase $TiO_2$ pigment may be dry milled using any number of dry milling devices familiar to those skilled in the art of pigmentary slurry production, including grinding mills, such as Raymond mills, ball mills, attrition mills, and impact mills, and crushing mills, such as pressure rollers. Grinding mills, in particular Raymond mills, are particularly useful in dry milling anatase $TiO_2$ pigment. However, the more preferred dry milling devices are crushing mills, especially pressure rollers.

Pressure rollers are relatively simple process equipment used for crushing and compacting (agglomerating) solid materials to produce pellets, tablets and briquettes in agglomeration operations. Commercial pressure rollers typically consist of two heavy rollers turning on parallel horizontal axes. $TiO_2$ is fed between the rollers where it is caught and broken by compression then dropped out below. The rollers turn toward each other at approximately the same speed and have relatively narrow faces and large diameters so that they can "nip" the $TiO_2$ lumps. Typical rollers have faces from about 1.5 to about 18 inches and diameters from about 8 to about 36 inches. To allow unbreakable material to pass without damaging the equipment, generally at least one roller is spring mounted. Pressure rollers can produce large quantities of crushed $TiO_2$ at relatively low cost.

Pressure rollers suitable for carrying out the present invention include those manufactured by The Fitzpatrick Company (832 Industrial Drive, Elmhurst, Ill., 60126), K. R. Komarek, Inc.(1825 Estes Avenue, Elk Grove Village, Ill. 60007), and Hosokawa Bepex Corporation (333 N. E. Taft Street, Minneapolis, Minn. 55413).

In pressure rolling, anatase $TiO_2$ pigment is fed into the nip or gap between two rolls rotating at approximately equal speeds. The anatase $TiO_2$ is pressed at a high pressure sufficient to form agglomerates of the $TiO_2$ by which it is simultaneously crushed. As the roller pressure increases, the mean particle size decreases. Suitable pressures are from about 750 to about 30,000 lb/in., preferably between about 1,000 and about 20,000 lb/in., and more preferably between about 4,000 and about 15,000 lb/in. Pressure rollers using grooved or rough surface rollers are preferred as they are more efficient at reducing the particle size of anatase $TiO_2$ than pressure rollers using smooth rollers. Further, it is preferred that the anatase $TiO_2$ pigment be passed through the pressure rollers only once.

Following the dry milling, the milled anatase $TiO_2$ is mixed with water to form the slurry. Typically the milled anatase $TiO_2$ pigment is mixed with water in a batch mixer and stirred until the desired solids content, degree of dispersion and viscosity is achieved. Preferably, the milled anatase pigment is added with intense mixing, using any of a number of mixing devices familiar to those skilled in the art of pigment slurry production. An agitator with a Cowles type blade or turbine impellers on a mixer of suitable horsepower are typical arrangements.

Tap water or deionized water can be used for the process of the invention. The pH of the water (or of the mixture of any dispersant or additive in the water) can vary, for example, from about 7 to about 12, preferably in the range of 8.5 to 11, and most preferably in the range of 9 to 10.

Anatase $TiO_2$ pigment may be mixed with the water in the presence of a dispersant to aid in the forming of the high solids slurry of anatase $TiO_2$ pigment. Suitable dispersing agents include any of the organic or inorganic dispersants abovementioned, with the acrylic acid dispersants being preferred. Of the preferred dispersants, the more preferred are as herein above described.

The preferred dispersants, selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymers or copolymers have been partially or completely neutralized with a neutralizing agent having a monovalent group and at least one neutralizing agent having a polyvalent group, may be used in amounts up to about 5% based on the weight of the anatase $TiO_2$ pigment to be slurried. Preferably the dispersants are used in amounts of from about 0.05 to about 1.0% by weight of the anatase $TiO_2$.

If one of the preferred acrylic acid dispersants is employed in the process for producing the high solids anatase $TiO_2$ slurry, the dispersant is added to the water first, the pH of the water mixture is then preferably adjusted to a value greater than 7, and then the anatase $TiO_2$ is added. Other dispersants may be added before, after, or with the addition of the anatase $TiO_2$ pigment.

Another option is that before mixing the dry milled anatase $TiO_2$ pigment with water, it may be de-agglomerated to break-up any agglomerates and yield a finely divided powder. De-agglomerating imparts better dispersability to the anatase $TiO_2$ pigment thereby aiding in the formation of the slurry. As agglomerates are dense and tend to settle out of a slurry, de-agglomerating also aids in preventing the clogging of pipes, filters, pumps, mills, etc., should the high solids anatase $TiO_2$ pigment slurry be further processed. In particular, de-agglomerating helps to prevent agglomerates of the anatase $TiO_2$ from setting in, for example, unmixed storage tanks.

De-agglomerating may be accomplished by using any number of devices and methods known to those skilled in the art of pigment slurry production. Pulverizing the dry milled anatase $TiO_2$ pigment using a Fitz mill (available from The Fitzpatrick Company) is particularly suitable for yielding a finely divided powder.

The high solids anatase $TiO_2$ slurries may be optionally wet milled to a desired mean pigmentary particle size. The resultant slurry is a high solids anatase $TiO_2$ pigment slurry within the purview of the present invention.

Wet milling of high solids anatase $TiO_2$ slurries may be performed using any of a number of wet milling devices and techniques known to those skilled in the art of making pigmentary slurries. The wet milling may be carried out in the presence of a grinding medium or in the absence of a grinding medium. Suitable wet mills include vertical sandmills, horizontal media mills, fluid energy mills, and high speed dispersers. Preferred are sand mills and horizontal media mills.

The process of the present invention also is applicable in the formation of high solids slurries of rutile titanium dioxide pigment produced by the sulphate process. A high solids slurry of TiO$_2$ pigment produced by the sulfate process containing at least about 75% TiO$_2$ pigment by weight may be obtained by first dry milling the TiO$_2$ pigment then mixing the dry milled rutile TiO$_2$ pigment with water, optionally, in the presence of an acrylic acid dispersant.

Dry milling TiO$_2$ pigment produced by the sulphate process may be accomplished by using any number of devices and methods familiar to those skilled in the art. Preferably, the dry milling of the TiO$_2$ pigment produced by the sulphate process is accomplished by pressure rolling the TiO$_2$ in the manner described above respecting the pressure rolling of anatase TiO$_2$ pigment.

The following examples set forth preferred embodiments of the invention. These embodiments are merely illustrative and are not intended to, and should not be construed to, limit the claimed invention in any way.

EXAMPLE 1

480.9 grams of tap water, 3.4 g of a polyacrylic acid homopolymer having a molecular weight of about 5,800 and having acid groups neutralized with sodium hydroxide at a rate of 0.06 and 4.5 g of Ca(OH)$_2$ were mixed together in a 2500 ml plastic beaker for 3 minutes using a Dispermat CV mixer equipped with a 2 inch Cowles blade. 1350 grams of calciner discharge anatase TiO$_2$ were slowly added at 1500 rpm until wet out. The slurry was mixed at 2000 rpm for 5 minutes. The slurry was sandmilled for 30 minutes at a sand:TiO$_2$ ratio of 1:1. 30 grams of water was added to the sandmill to improve the fluidity of the slurry/sand mixture. The TiO$_2$ slurry was separated from the sand, and the solids content was measured as 72.6%. Slurry Brookfield and Hercules viscosity data are presented in Table 1.

Pressure Rolled Anatase TiO$_2$

Anatase TiO$_2$ calciner discharge was pressure rolled using a Fitzpatrick Model L-83 pressure roller. The rollers were 8 inches in diameter and 1½ inches wide. A hydraulic cylinder pressure of 900 psi (which corresponds to a linear force of 7,763 lb/in) was employed. The pressure rolled product was subsequently pulverized using a Fitz mill model DAS06. This pressure rolled and Fitz milled product was used in the following examples 2–4, 6, and 8–9 where it is referred to simply as pressure rolled anatase TiO$_2$.

EXAMPLE 2

551 grams of tap water, 5.0 g of a polyacrylic acid homopolymer having a molecular weight of about 5,800 and having acid groups neutralized with sodium hydroxide at a rate of 0.06 and 2.4 g of Ca(OH)$_2$ were mixed together in a 2500 ml plastic beaker for 3 minutes using a Dispermat CV mixer equipped with a 2 inch Cowles blade. 2500 grams of the pressure rolled anatase TiO$_2$ were added at 1500 rpm until wet out. The slurry was mixed at 2000 rpm for 5 minutes. The pH was adjusted to about 10 using Ca(OH)$_2$. The slurry was sandmilled for 15 minutes at a sand:TiO$_2$ ratio of 1:1. The TiO$_2$ slurry was separated from the sand. The solids content was measured as 81.4%. Slurry Brookfield and Hercules viscosity data are presented in Table 1.

EXAMPLE 3

The slurry prepared in example 2 was diluted with tap water to 77.5% solids. Slurry Brookfield and Hercules viscosity data are presented in Table 1.

EXAMPLE 4

The slurry prepared in example 2 was diluted with tap water to 72.5% solids. Slurry Brookfield and Hercules viscosity data are presented in Table 1.

EXAMPLE 5

Calciner discharge anatase TiO$_2$ was dry ground using a Raymond mill. This dry ground anatase TiO$_2$ is referred to as Raymond milled TiO$_2$ in this example.

551 grams of tap water, 5.0 g of a polyacrylic acid homopolymer having a molecular weight of about 5,800 and having acid groups neutralized with sodium hydroxide at a rate of 0.06 and 2.4 g of Ca(OH)$_2$ were mixed together in a 2500 ml plastic beaker for 3 minutes using a Dispermat CV mixer equipped with a 2 inch Cowles blade. 2000 grams of the Raymond milled anatase TiO$_2$ calciner discharge product were added at 1500 rpm. Three minutes were required to add the anatase TiO$_2$. The slurry was mixed at 2000 rpm for 5 minutes, and the pH was adjusted to about 10 using Ca(OH)$_2$. The slurry was sandmilled for 30 minutes at a sand:TiO$_2$ ratio of 1:1. The TiO$_2$ slurry was separated from the sand, and the solids content was measured as 78.2%. Slurry Brookfield and Hercules viscosity data are presented in Table 1.

EXAMPLE 6

551 grams of tap water, 5.0 g of a polyacrylic acid homopolymer having a molecular weight of about 5,800 and having acid groups neutralized with sodium hydroxide at a rate of 0.06 and 2.4 g of Ca(OH)$_2$ were mixed together in a 2500 ml plastic beaker for 3 minutes using a Dispermat CV mixer equipped with a 2 inch Cowles blade. 2000 grams of pressure rolled anatase TiO$_2$ were added over 3 minutes at 1500 rpm. The slurry was mixed at 2000 rpm for 5 minutes, and the pH was adjusted to about 10.0 using Ca(OH)$_2$. The slurry was sandmilled for 15 minutes at a sand:TiO$_2$ ratio of 1:1. The TiO$_2$ slurry was separated from the sand, and the solids content was measured as 77.7%. Slurry Brookfield and Hercules viscosity data are presented in Table 1.

EXAMPLE 7

An anatase slurry was made according to the procedure of Example 1, except that the pH was maintained at about 9.0. The slurry of calciner discharge anatase TiO$_2$ proved too viscous and dilatent to sandmill.

EXAMPLE 8

551 grams of tap water, 5.0 g of a polyacrylic acid homopolymer having a molecular weight of about 5,800 and having acid groups neutralized with sodium hydroxide at a rate of 0.06 and 2.4 g of Ca(OH)$_2$ were mixed together in a 2500 ml plastic beaker for 3 minutes using a Dispermat CV mixer equipped with a 2 inch Cowles blade. 2000 grams of pressure rolled and pulverized anatase TiO$_2$ calciner discharge product were added over 3 minutes at 1500 rpm. The slurry was mixed at 2000 rpm for 5 minutes. The slurry was sandmilled for 15 minutes at a sand:TiO$_2$ ratio of 1:1.

The TiO$_2$ slurry was separated from the sand, and the solids content was measured as 78.3%. The slurry pH was 6.8. Slurry Brookfield and Hercules viscosity data are presented in Table 1.

EXAMPLE 9

551 grams of tap water, 5.0 g of a polyacrylic acid homopolymer having a molecular weight of about 5,800 and having acid groups neutralized with sodium hydroxide at a rate of 0.06 and 2.4 g of Ca(OH)$_2$ were mixed together in a 2500 ml plastic beaker for 3 minutes using a Dispermat CV mixer equipped with a 2 inch Cowles blade. 2000 grams of pressure rolled anatase TiO$_2$ were added at 1500 rpm. The slurry was mixed at 2000 rpm for 5 minutes, and the pH was adjusted to about 8.4 using Ca(OH)$_2$. The slurry was sand-milled for 15 minutes at a sand:TiO$_2$ ratio of 1:1. The TiO$_2$ slurry was separated from the sand, and the solids content was measured as 78.4%. The slurry pH was 8.1. Slurry Brookfield and Hercules viscosity data are presented in Table 1.

TABLE 1

|  | % Solids | pH | Brookfield Viscosity | Hercules Rheology |
|---|---|---|---|---|
| Example 1 (prior art) | 72.6 | 10.7 | 560 cps | dilatent at 800 rpm |
| Example 2 | 81.4 | 9.7 | 1480 cps | 10.5* |
| Example 3 | 77.5 |  | 670 cps | 8.0* |
| Example 4 | 72.5 |  | 420 cps | 5.5* |
| Example 5 | 78.2 | 9.7 | 740 cps | 7.9* |
| Example 6 | 77.7 | 10.0 | 630 cps | not measured |
| Example 7 (prior art) | 72.5 | 9.0 | too viscous to mill | — |
| Example 8 | 78.3 | 6.8 | 700 cps | 7.7* |
| Example 9 | 78.4 | 8.1 | 640 cps | 8.3* |

*dynes-cm × 10$^{-5}$ at 4400 rpm.

Comparison of example 1 of the prior art with examples 2–5 shows that dry grinding anatase calciner discharge TiO$_2$ allows production of higher solids slurries. Also at comparable solids levels (about 72.5% in examples 1 and 4), the slurry produced from pressure rolled anatase calciner discharge has significantly lower viscosity.

Examples 8 and 9 show that high solids slurries can be produced at low pH values using pressure rolled anatase calciner discharge TiO$_2$ in contrast to the viscous slurries, even at low solids, obtained from normal anatase calciner discharge TiO$_2$ at pH of 9, shown by example 7.

Upon reading the subject application, various alternative constructions and embodiments will become obvious to those skilled in the art. These variations are to be considered within the scope and spirit of the subject invention. The subject invention is only to be limited by the claims which follow and their equivalents.

What is claimed is:

1. A high solids slurry of anatase TiO$_2$ pigment comprising greater than 75% by weight of anatase TiO$_2$ pigment dispersed in water and a dispersing agent; wherein said dispersing agent is selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamids, acrlonitrile, ethylene, propylene, strene and esterss of the acids, wherein the homopolymers or copolymers have been partially or completely neutralized with a neutralizing agent having a monovalent group and at least one neutralizing agent having a polyvalent group.

2. The slurry of claim 1, wherein the slurry has a Brookfield viscosity of less than 1500 cps.

3. The slurry of claim 2, wherein the viscosity is less than 1000 cps.

4. The slurry of claim 2, wherein the viscosity is from about 400 to about 800 cps.

5. The slurry of claim 1, wherein the slurry is not dilatent at an A-bob rotational speed of less than 1100 rpm as measured by Hercules rheometer.

6. The slurry of claim 1, wherein the slurry has a Hercules torque value less than 18×10$^5$ dynes-cm.

7. The slurry of claim 1, wherein the slurry has a Hercules torque value from about 2 to about 12×10$^5$ dynes-cm.

8. The slurry of claim 1, comprising up to about 85% by weight anatase TiO$_2$.

9. The slurry of claim 1, comprising up to about 81% by weight anatase TiO$_2$.

10. The slurry of claim 1, comprising greater than 77% by weight anatase TiO$_2$.

11. The slurry of claim 1, comprising greater than 80% by weight anatase TiO$_2$.

12. The slurry of claim 1, wherein said dispersing agent comprises an acrylic acid homopolymer.

13. The slurry of claim 1, wherein said neutralizing agent having a monovalent group is an alkali metal cation and said neutralizing agent having a polyvalent group is a calcium cation.

14. The slurry of claim 1, wherein said dispersing agent has a molecular weight in the range from about 2,000 to about 10,000.

15. The slurry of claim 1, wherein said anatase TiO$_2$ comprises dry milled crude calciner discharge anatase TiO$_2$.

16. A high solids slurry of anatase TiO$_2$ pigment comprising greater than 75% by weight of anatase TiO$_2$ in water and a dispersing agent, the slurry having a pH of from about 5 to about 12; wherein said disersing agent is selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymers or copolymers have been partially or completely neutralized with a neutralizing agent having a monovalent group and at least one neutralizing agent having a polyvalent group.

17. The slurry of claim 16, wherein the pH is less than 9.

18. The slurry of claim 16, wherein the pH is from about 5 about 9.

19. The slurry of claim 16, wherein the pH is from about 5 to about 7.

20. The slurry of claim 18, comprising up to about 85% by weight anatase TiO$_2$.

21. The slurry of claim 18, comprising up to about 81% by weight anatase TiO$_2$.

22. The slurry of claim 18, comprising greater than 77% by weight anatase TiO$_2$.

23. The slurry of claim 18, comprising greater than 80% by weight anatase TiO$_2$.

24. The slurry of claim 16, wherein said dispersing agent comprises an acrylic acid homopolymer.

25. The slurry of claim 16, wherein said neutralizing agent having a monovalent group is an alkali metal cation and said neutralizing agent having a polyvalent group is a calcium cation.

26. The slurry of claim 16, wherein said dispersing agent has a molecular weight in the range of from about 2,000 to about 10,000 .

27. A high solids slurry of anatase TiO$_2$ pigment comprising greater than 75% by weight of anatase TiO$_2$ in water and a dispersing agent, the slurry having Brookfield viscosity of less than 1500 cps, a Hercules torque value of less than about 18 ×10$^5$ dynes-cm, and a pH of less than 9; wherein the dispersing agent is selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymers or copolymers have been partially or completely neutralized with a neutralizing agent having a monovalent group and at least one neutralizing agent having a polyvalent group.

28. A process for preparing a high solids slurry of anatase $TiO_2$ pigment which comprises greater than 75% by weight anatase $TiO_2$ pigment, comprising:
  a) dry miling the $TiO_2$ pigment; and
  b) mixing said dry milled $TiO_2$ pigment with water in the presence of a dispersant selected from the group consisting of i) acrylic acid homopolymers and ii) copolymers that are predominantly acrylic acid and contain at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymers or copolymers have been partially or completely neutralized with a neutralizing agent having a monovalent group and at least one neutralizing agent having a polyvalent group, thereby forming said slurry.

29. The process of claim 28, wherein said dry milling comprises pressure rolling.

30. The process of claim 28, wherein said dry milling comprises grinding.

31. The process of claim 28, wherein said dry milling comprises Raymond milling.

32. The process of claim 28, wherein said dry milling comprises crushing.

33. The process of claim 28, wherein said anatase $TiO_2$ comprises crude calciner discharge anatase $TiO_2$ product.

34. The process of claim 28, wherein said dispersant comprises an acrylic acid homopolymer.

35. The process of claim 28, wherein said neutralizing agent having a monovalent group is an alkali metal cation and said neutralizing agent having a polyvalent group is a calcium cation.

36. The process of claim 28, wherein said dispersant is present in an amount up to 5% by weight of said anatase $TiO_2$ present in said slurry.

37. The process of claim 28, wherein said dispersant is present in the amount of from about 0.05 to about 1.0% by weight of said anatase $TiO_2$ present in said slurry.

38. The process of claim 29, wherein said pressure rolling is carried out at linear forces of from about 750 to about 30,000 lbs./in.

39. The process of claim 29, wherein said pressure rolling is carried out at linear forces of from about 1,000 about 20,000 lbs./ins.

40. The process of claim 29, wherein said pressure rolling is carried out at linear forces of from about 4,000 to about 15,000 lbs/in.

41. The process of claim 28, further comprising wet milling said slurry to a mean pigmentary particle size.

42. The process of claim 41, wherein said wet milling is carried out in the presence of a grinding medium.

* * * * *